United States Patent [19]

Gonda

[11] 4,119,906
[45] Oct. 10, 1978

[54] CONSTANT HIGH VOLTAGE GENERATING CIRCUIT

[75] Inventor: Tsunemi Gonda, Yamato, Japan
[73] Assignee: Nippon Kogaku K.K., Tokyo, Japan
[21] Appl. No.: 775,109
[22] Filed: Mar. 7, 1977
[30] Foreign Application Priority Data
Mar. 6, 1976 [JP] Japan .................................. 51-23721
[51] Int. Cl.² ............................................. G05F 1/58
[52] U.S. Cl. ............................... 323/22 T; 307/297; 323/23; 323/25; 363/35; 361/18
[58] Field of Search ................. 363/37, 35; 323/9, 17, 323/DIG. 1, 22 T, 23, 25; 361/18; 307/296, 297

[56] References Cited
U.S. PATENT DOCUMENTS

| | | | |
|---|---|---|---|
| 3,621,372 | 11/1971 | Paine et al. | 323/17 |
| 3,641,267 | 2/1972 | Cavallari | 323/22 T |
| 3,659,190 | 4/1972 | Galluppi | 323/22 T |
| 3,758,841 | 9/1973 | Bourbeau | 323/22 T |
| 3,818,318 | 6/1974 | Schott et al. | 323/9 |
| 3,975,672 | 8/1976 | Lachocki | 323/17 |
| 4,035,710 | 7/1977 | Joyce | 363/37 |

OTHER PUBLICATIONS

Electronic Design 6, Mar. 15, 1975, pp. 54–58.
Electronics, Apr. 29, 1976, p. 138.

Primary Examiner—Gerald Goldberg
Attorney, Agent, or Firm—Shapiro and Shapiro

[57] ABSTRACT

In a constant high voltage generating circuit for converting the high voltage of an unregulated voltage source into a constant voltage by means of a control element operable in response to the output of an error detecting circuit for detecting any error of the output voltage of the constant voltage generating circuit, there is provided a circuit for generating a high frequency wave corresponding to the output of the error detecting circuit, and a circuit for receiving the wave and applying it to the input of the control element, whereby the output of the error detecting circuit may be transmitted to the control element by the high frequency wave.

7 Claims, 6 Drawing Figures

CONSTANT HIGH VOLTAGE GENERATING CIRCUIT

BACKGROUND OF THE INVENTION

1. Field of the Invention

This invention relates to a constant voltage generating circuit which converts the output voltage of an unregulated voltage source into a constant high voltage.

2. Description of the Prior Art

For example, the constant high voltage generating circuit for operating a photomultiplier or the like has included a plurality of series-connected control transistors and a circuit for detecting any error of the output of the constant or regulated voltage generating circuit, whereby the collector-emitter resistances of the control transistors have been controlled by the output of the detecting circuit to convert the voltage of an unregulated voltage source into a constant voltage. The purpose of the plurality of control transistors used in the above-described circuit lies in that if a high voltage is applied to the control transistors as the result of the output of the circuit being short-circuited, the transistors divide such high voltage so that they may be individually prevented from being broken down by the voltage. In the constant voltage generating circuit of the described type, however, the base currents of the plurality of control transistors are all supplied from an unregulated voltage source and this has led to a correspondingly great capacity required of the unregulated voltage source, and also to the disadvantage of a limited range within which the output voltage of the constant voltage generating circuit is variable. On the other hand, to overcome such disadvantages, there has been proposed a constant voltage generating circuit in which a photocoupler responsive to the output of the above-described error detecting circuit and a voltage source for supplying the base currents of the plurality of control transistors are provided separately so that the base currents may be controlled by the photocoupler, but the circuit of this type has these disadvantages: since the output of such constant voltage circuit is a high voltage, and accordingly, the separate voltage source is of a high voltage, the separate voltage source must be capable of withstanding a high voltage and thus must have a high dielectric breakdown voltage property with respect to the earth, and the same is true of the photocoupler. Thus, the conventional constant voltage circuit of the latter type has suffered from a disadvantage in that a high voltage withstanding property is required of the circuit for transmitting the output of the error detecting circuit to the inputs of the control transistors. Further, the use of the photocoupler has led to a limited range within which the inputs of the control transistors can be highly accurately controlled in accordance with the error detecting circuit, and accordingly has led to a limited range within which the output of the constant voltage circuit is controlled.

SUMMARY OF THE INVENTION

The present invention has, for its object, to provide a constant high voltage generating circuit which can efficiently convert the voltage of an unregulated voltage source into a very stable constant voltage and in which the circuit for transmitting the output of the error detecting circuit to the input of a control element may be made to have a high voltage withstanding property, as desired.

According to the present invention, the constant high voltage generating circuit comprises a circuit for generating a high frequency wave corresponding to the output of the error detecting circuit, and a circuit for receiving the wave and applying it to the input of the control element, whereby the output of the error detecting circuit may be transmitted to the control element by the high frequency wave.

The wave generated by the high frequency wave generating circuit may be a wave having an amplitude, a frequency or a phase variable in accordance with the output of the error detecting circuit.

The control element may be a transistor having its collector and emitter connected between the output terminal of the unregulated voltage source and the output terminal of the constant high voltage generating circuit.

The constant high voltage generating circuit may further comprise a detecting circuit for detecting the short-circuiting, etc. of the constant high voltage generating circuit. The detection output of the detecting circuit causes the high frequency wave generating circuit to generate a wave for increasing the equivalent collector-emitter resistance of the control transistor.

The high frequency wave generating circuit may include an oscillator, a circuit for modulating the output of the oscillator by the output of the error detecting circuit, and a coil for transmitting the modulated output into the air. The application circuit may include a coil for receiving the transmitted wave signal and a rectifier for rectifying the output current of the reception coil and applying the rectified current to the control element.

The invention will become more fully apparent from the following detailed description of some embodiments thereof taken in conjunction with the accompanying drawings.

DESCRIPTION OF THE PREFERRED EMBODIMENTS

Figure 1:
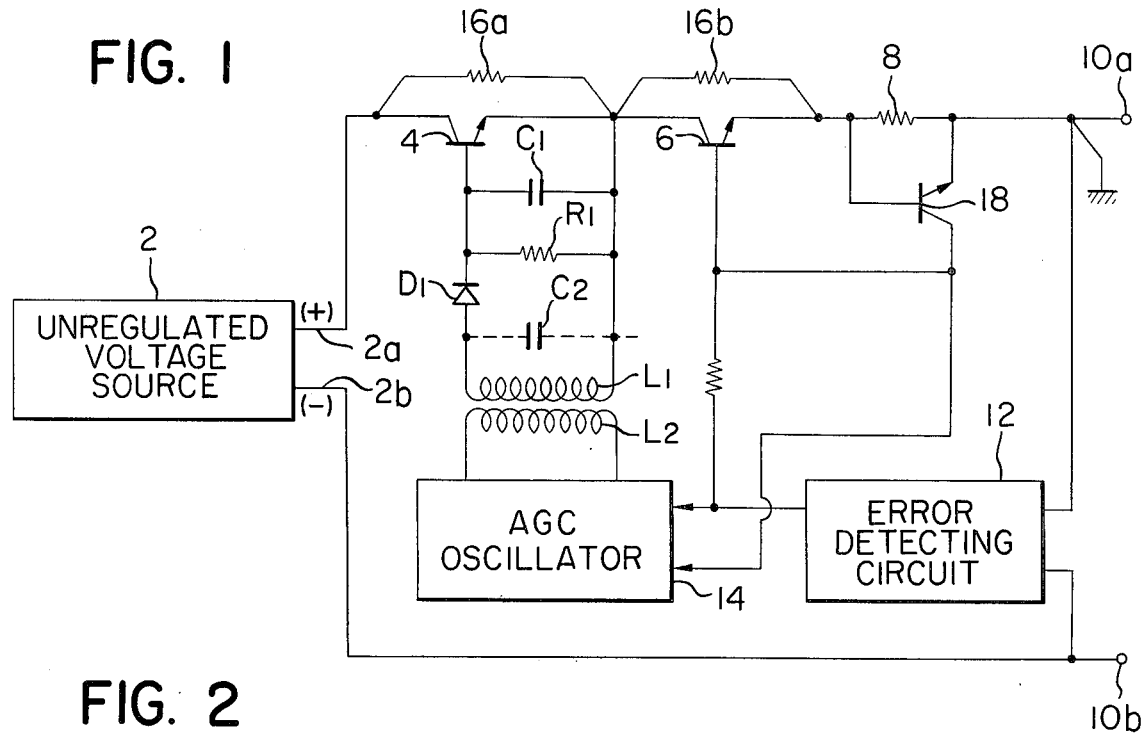
FIG. 1 is a combined block and schematic diagram of a first embodiment of the present invention.

Referring to FIG. 1 which shows a first embodiment of the present invention, the collector of a control transistor 4 is connected to the positive terminal 2a of an unregulated DC voltage source 2, and the collector of a control transistor 6 is connected to the emitter of the transistor 4. The emitter of the transistor 6 is connected through a resistor 8 to the grounded output terminal 10a of the constant high voltage generating circuit, and the negative terminal 2b of the unregulated voltage source 2 is connected to the other output terminal 10b of the constant high voltage generating circuit. An error detecting circuit 12 has its input terminals connected to the output terminals 10a and 10b to detect any amount of error in the actual output voltage of the constant voltage generating circuit with respect to the set value of the output voltage thereof and generate an output corresponding to the detected amount of error. The output of the detecting circuit 12 directly controls the base potential of the control transistor 6. Further, the output of the detecting circuit 12 is applied to an automatic gain control type oscillator 14 (hereinafter referred to as the AGC oscillator). The AGC oscillator 14 flows to a coil $L_2$ an AC signal having an amplitude corresponding to the magnitude of the output of the detecting circuit 12. A coil $L_1$ is disposed on a printed board in a predetermined spaced apart relationship with the coil $L_2$ on the printed board, so as to be high-frequency-coupled to the coil $L_2$. Designated by $D_1$ is a rectifier diode. A capacitor $C_1$ and a resistor $R_1$ are provided to smooth the signal rectified by the diode $D_1$. The coil $L_1$, capacitor $C_1$, resistor $R_1$ and diode $D_1$ together constitute a circuit for applying the base current to the control transistor 4. Summing up, the output of the detecting circuit 12 is thus converted into the amplitude of the AC signal of the AGC oscillator 14 by the AGC oscillator, and put out in the form of a high frequency wave signal from the coil $L_2$. The wave signal received by the coil $L_1$ is rectified and smoothed by the base current application circuit $L_1$, $C_1$, $R_1$, $D_1$ into a direct current having a magnitude corresponding to the magnitude of the amplitude of the AC signal, and applied to the base of the control transistor 4. More specifically, when the output voltage of the constant voltage circuit becomes higher than its set value, the output voltage of the error detecting circuit 12 drops and accordingly decreases the base potential of the control transistor 6, thus increasing the equivalent resistance between the collector and emitter of this transistor. The drop of the output voltage of the error detecting circuit 12 also reduces the AC amplitude of the AGC oscillator 14 and accordingly, the base current application circuit $L_1$, $C_1$, $R_1$, $D_1$ decreases the base current of the control transistor 4, thus increasing the equivalent resistance between the collector and emitter of the transistor 4. In this manner, the output voltage of the constant voltage circuit can be lowered to its set value. Conversely, when the output voltage of the constant voltage circuit becomes lower than its set value, each of the above-mentioned circuits generates an opposite output to increase the output of the constant voltage generating circuit to its set value. In this manner the constant voltage generating circuit can always generate a stabilized or regulated output voltage equal to its set value.

Description will now be made of the operation of this circuit in case where a load of very small resistance value is connected between the output terminals 10a and 10b of the circuit or where the output terminals are short-circuited (these cases will hereinafter be referred to as the case of short-circuiting or the like). A circuit for detecting the short-circuiting or the like is constituted by the resistor 8 of a small resistance value connected between the output terminal 10a and the emitter of the transistor 6 and a transistor 18 having its emitter and base connected to the opposite ends of the resistor 8 and having its collector connected to the base of the control transistor 6 and to the oscillator 14. In the case of short-circuiting or the like of the constant voltage generating circuit, a heavy current greater than the rated current flows through this circuit and therefore, the overcurrent thereof is detected by the resistor 8 and the transistor 18, so that this transistor is rendered conductive. This conduction reduces the base potential of the control transistor 6 and the input potential of the oscillator 14, thus increasing the equivalent collector-emitter resistances of both the control transistors 6 and 4. In this manner, the above-mentioned heavy current is momentarily made into a constant small current and the high voltage of the unregulated voltage source 2 is divided by the control transistors 4 and 6 connected in series with each other. When this occurs, the emitter of the transistor 6 is grounded through the small resistor 8 so that the base potential thereof is low but the base potential of the transistor 4 becomes high. For example, in order to obtain a constant voltage of 1000 V from this constant voltage generating circuit, the maximum voltage of the unregulated voltage source is of the order of 1200 V and thus, due to short-circuiting of the output, a voltage of maximum 600 V or so is applied to each of the transistors 4 and 6, so that the base potential of the transistor 4 reaches about 600 V. Since, however, the coils $L_1$ and $L_2$ are insulated from each other by air and the printed board, it is possible to prevent the aforementioned high voltage from being applied to the AGC oscillator 14 by providing a suitable spacing between the two coils. This eliminates the necessity for the oscillator 14 to have a high voltage withstanding property.

Resistors 16a and 16b connected between the collectors and emitters of the control transistors 4 and 6, respectively, have high resistance values equal to each other, and serve to cause the voltage of the unregulated voltage source to be equally applied to the two transistors during the short-circuiting of the circuit. Also, if a capacitor $C_2$ is parallel-connected to the coil $L_1$, as indicated by dotted line, so that the coil $L_1$ may be resonated by the frequency of the wave received from the oscillator 14, then it will be possible to enhance the transmission efficiency of the signal from the oscillator 14. In the first embodiment described above, the output terminal 10a is grounded so that the base potential of the transistor 6 is low even during the short-circuiting between the output terminals 10a and 10b, and that is why the output of the detecting circuit 12 is connected directly to the base of that transistor.

Figure 2:
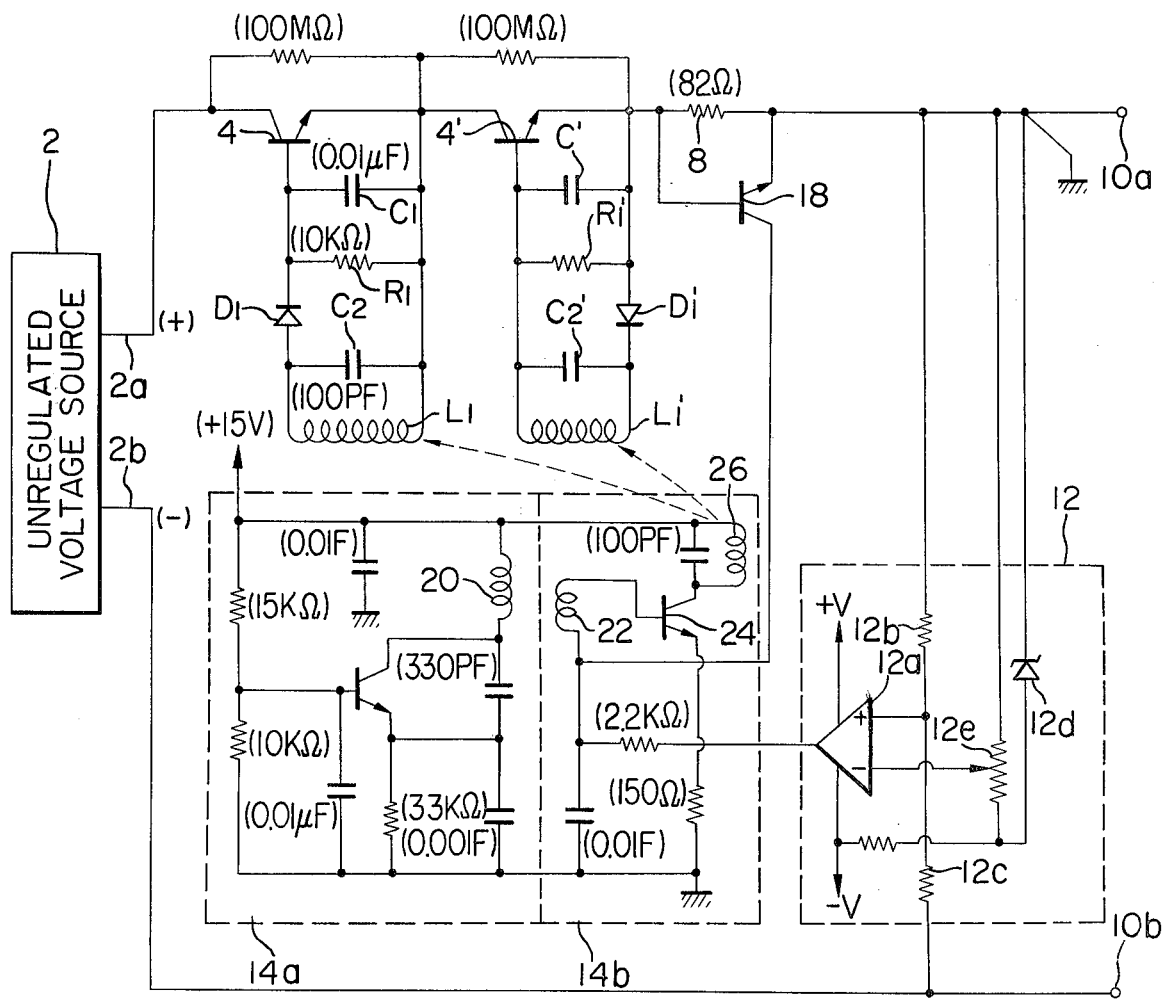
FIG. 2 is a similar diagram showing a specific circuit in a modification of the first embodiment.

Reference will now be had to FIG. 2 which shows a specific example of the AGC oscillator and error detecting circuit and a modification of the first embodiment in which a plurality of control transistors are all controlled by the output of the AGC oscillator. In FIG. 2, one input terminal of a differential amplifier 12a is connected to the junction between a pair of resistors 12b and 12c for dividing the output voltage of the present constant voltage generating circuit, and the other input terminal of the differential amplifier is connected to a potentiometer 12e which is cooperable with a Zener diode 12d to generate a reference voltage, and the output of the differential amplifier acts as the output of an error detecting circuit 12. The amplifier 12a, resistors 12b, 12c, potentiometer 12e and Zener diode together constitute the error detecting circuit 12. The coil 22 of a reverse AGC circuit 14b receiving the AC output of an oscillator 14a from the coil 20 thereof has its one end connected to the base of a transistor 24 and its other end connected to the collector of a transistor 18 and to the output of the error detecting circuit 12 through a resistor. The transistor 24 flows to an output coil 26 a current resulting from the AC current flowing to the coil 22 being amplified in accordance with the output voltage of the error detecting circuit 12. That is, the transistor 24 amplitude-modulates the output of the oscillator 14a in accordance with the output of the detecting circuit 12. Thus, the reverse AGC circuit 14b generates from the output coil 26 a high frequency having an amplitude corresponding to the output of the error detecting circuit 12. Coils $L_1$ and $L_1'$ insulated from the output coil 26 by air and the printed board receive the wave signal to control their associated control transistors 4 and 4', respectively. When short-circuiting or the like occurs to the output terminals 10a and 10b, the collector potential of the transistor 18 and accordingly, the base potential of the transistor 24, drops, so that the amplitude of the wave from the output coil 26 is extremely reduced to thereby increase the equivalent collector-emitter resistances of the control transistors 4 and 4', and these two transistors share the output voltage of the unregulated voltage source 2. In the embodiment described above, the output voltage of the unregulated voltage source 2 can be shared by the two transistors 4, 6 and 4, 4' during the short-circuiting, but if such two transistors are not enough, the number of the transistors may be suitably increased. Also, the output voltage of this constant voltage generating circuit can be adjusted by setting the resistance value of the potentiometer 12e in the error detecting circuit 12. The coils 26, $L_1$ and $L_1'$ are shielded from other coils such as coils 20, 22. FIG. 2 also indicates the numerical value of each circuit element in parentheses.

Figure 3:
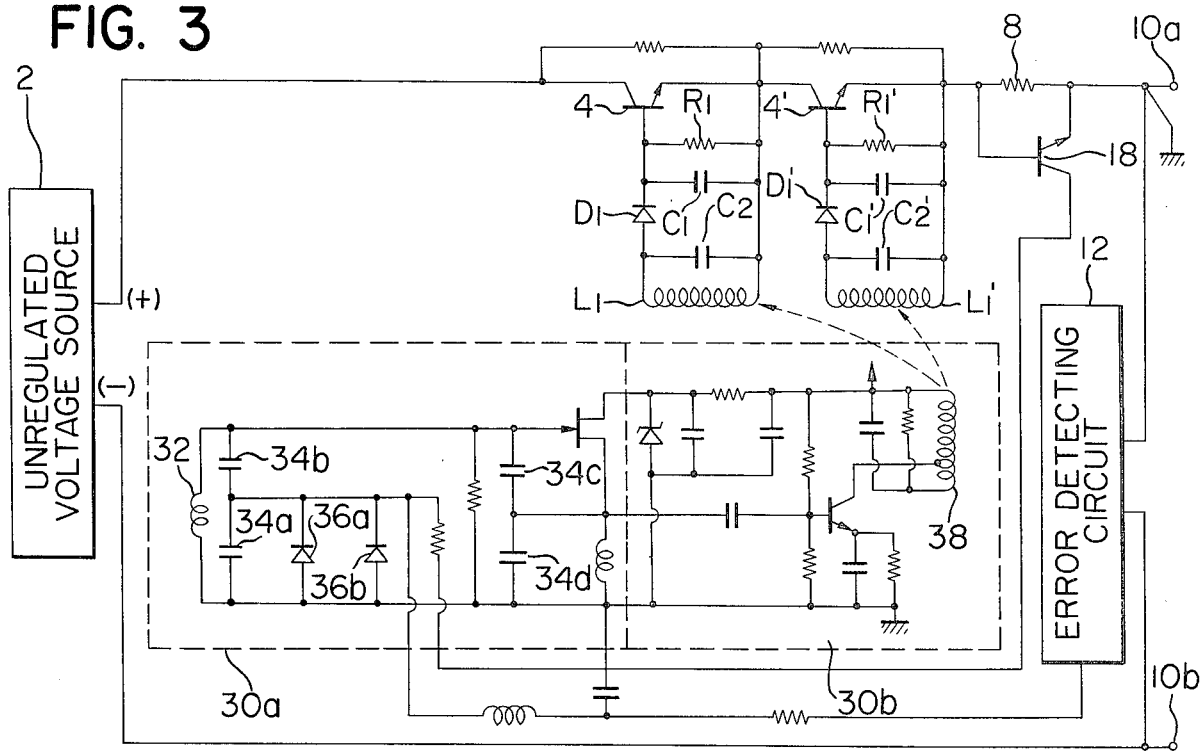
FIG. 3 is a similar diagram showing a specific circuit of a second embodiment.

In the embodiment described above, the output of the error detecting circuit 12 is first converted into the amplitude of a high frequency wave and then transmitted to the control transistors, whereas FIG. 3 shows a second embodiment in which said output is first converted into the frequency of a high frequency wave and then transmitted to the control transistors.

In FIG. 3, a frequency modulation oscillator 30a generates an alternating current having a frequency determined by a resonance circuit comprising a coil 32, capacitors 34a, 34b, 34c, and 34d and variable capacity diodes 36a and 36b parallel-connected to the capacitor 34a, and the alternating current is amplified by an amplifier circuit 30b and radiated from an output coil 38 in the form of a high frequency wave. Since the cathodes of the variable capacity diodes 36a and 36b are connected to the output of an error detecting circuit 12, the electrostatic capacities of these variable capacity diodes are varied by the output voltage of the detecting circuit 12. Thus, the frequency of the oscillator 30a is varied in accordance with the output voltage of the detecting circuit 12, so that the output of the detecting circuit 12 is converted into the frequency of the wave generated by an output coil 38 and applied to the inputs of control transistors 4 and 4' through the base current control circuits $C_1$, $C_2$, $D_1$, $R_1$, $L_1$ and $C_1'$, $C_2'$, $D_1'$, $R_1'$, $L_1'$.

The parallel-connected coils and capacitors $L_1$, $C_2$ and $L_1'$, $C_2'$ in the above-mentioned base current application circuits constitute parallel resonance circuits and therefore, these two base current application circuits flow to the control transistors 4 and 4' currents substantially proportional to the frequency of the waves received by the coils $L_1$ and $L_1'$. In this manner, the constant voltage generating circuit is properly operated to generate a constant voltage. Also, in the case of short-circuiting or the like, the collector potential of the transistor 18 drops to the vicinity of the grounded potential, so that the oscillation is stopped and accordingly, the wave from the output coil 38 is nullified and consequently, the equivalent collector-emitter resistances of the control transistors 4 and 4' are increased and these two transistors share the voltage from the unregulated voltage source 2. Reference will now be had to describe a third embodiment of FIG. 4 in which the output of the error detecting circuit 12 is converted into the phase of a high frequency wave and transmitted to the control transistors.

Figure 4:
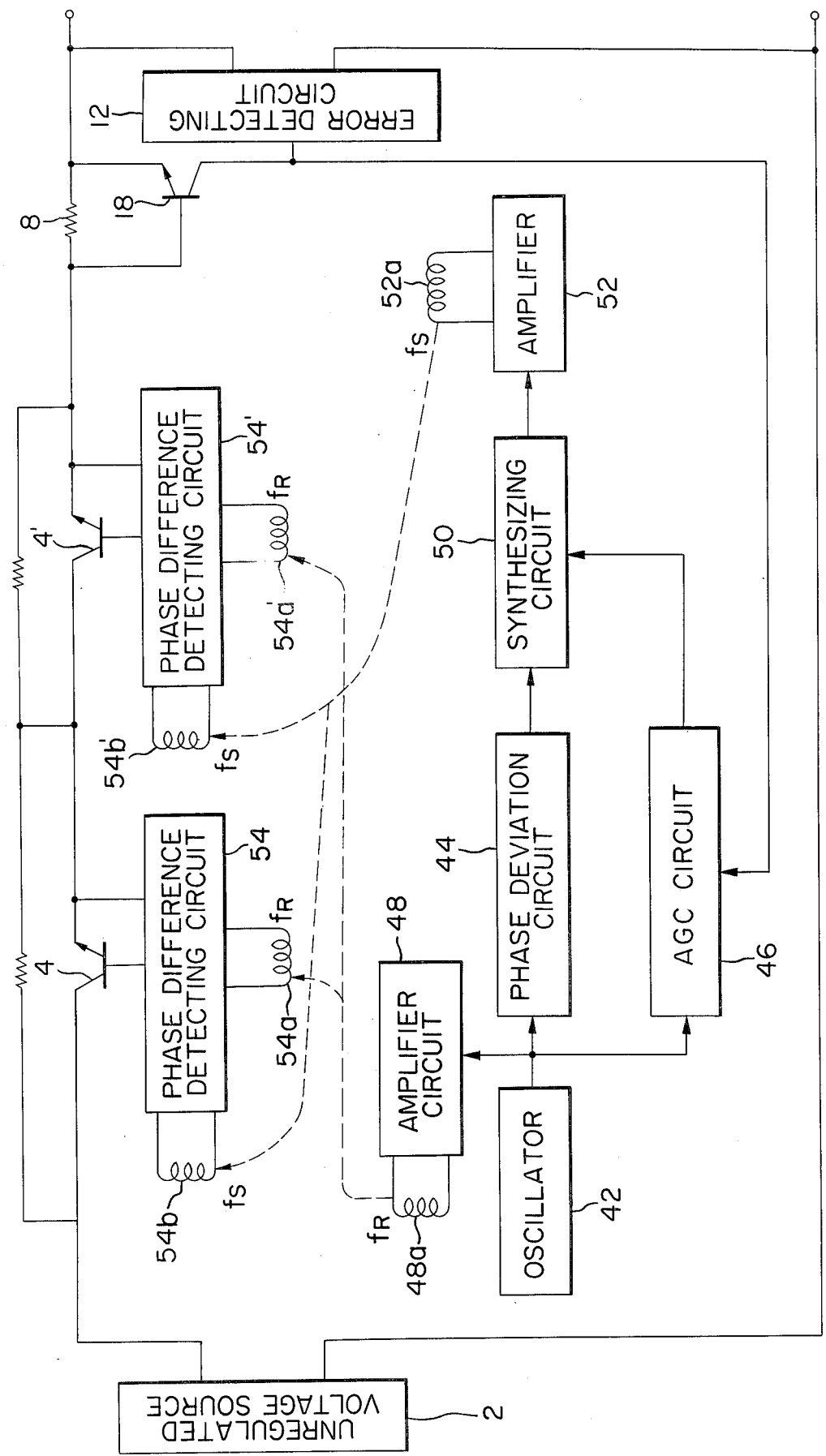
FIG. 4 is a similar diagram of a third embodiment.

In FIG. 4, the output of an oscillator 42 is supplied to a phase deviation circuit 44, an AGC circuit 46 and an amplifier 48. The amplifier circuit 48 amplifies the output of the oscillator 42 and generates a reference phase wave signal $f_R$ from the output coil 48a thereof. The AGC circuit 46 varies the magnitude of the amplitude of the input in accordance with the magnitude of the output of the error detecting circuit 12. A signal synthesizing circuit 50 synthesizes the output of the oscillator 42 deviated by for example ($\pi/2$) in the phase deviation circuit 44 and the output of the oscillator 42 amplitude-modulated in the AGC circuit 46 in accordance with the output of the error detecting circuit 12. The output of the synthesizing circuit 50 is amplified by an amplifier 52, the output coil 52a of which generates a control wave signal $f_s$. Thus, the control wave signal $f_s$ from the coil 52a has a phase difference corresponding to the output of the error detecting circuit 12, with respect to the reference phase wave signal $f_R$ from the coil 48a.

Phase difference detecting circuits 54 and 54' respectively have coils 54a and 54a' for receiving the reference wave $f_R$ from the output coil 48a and coils 54b and 54b' for receiving the control wave $f_s$ from the output coil 52a, and these detecting circuits 54 and 54' detect the phase differences between their respective two input signals and flow to the transistors 4 and 4' base currents corresponding to the detected phase differences. In this manner, the output of the error detecting circuit 12 is converted into the phase difference between the wave signals $f_R$ and $f_s$ and transmitted to the control transistors 4 and 4' to control them so that the output voltage of the present constant voltage circuit may be equal to its set value.

In case of the short-circuiting of this constant voltage circuit or the like, the AGC circuit 46 having received the outputs of the short-circuit detecting circuits 8 and 18 controls the phase difference between the control wave signal $f_s$ and the reference wave signal $f_R$ to greatly increase the equivalent collector-emitter resistances of the control transistors 4 and 4', thus causing these two transistors to share the voltage from the unregulated voltage source 2.

Figure 5:
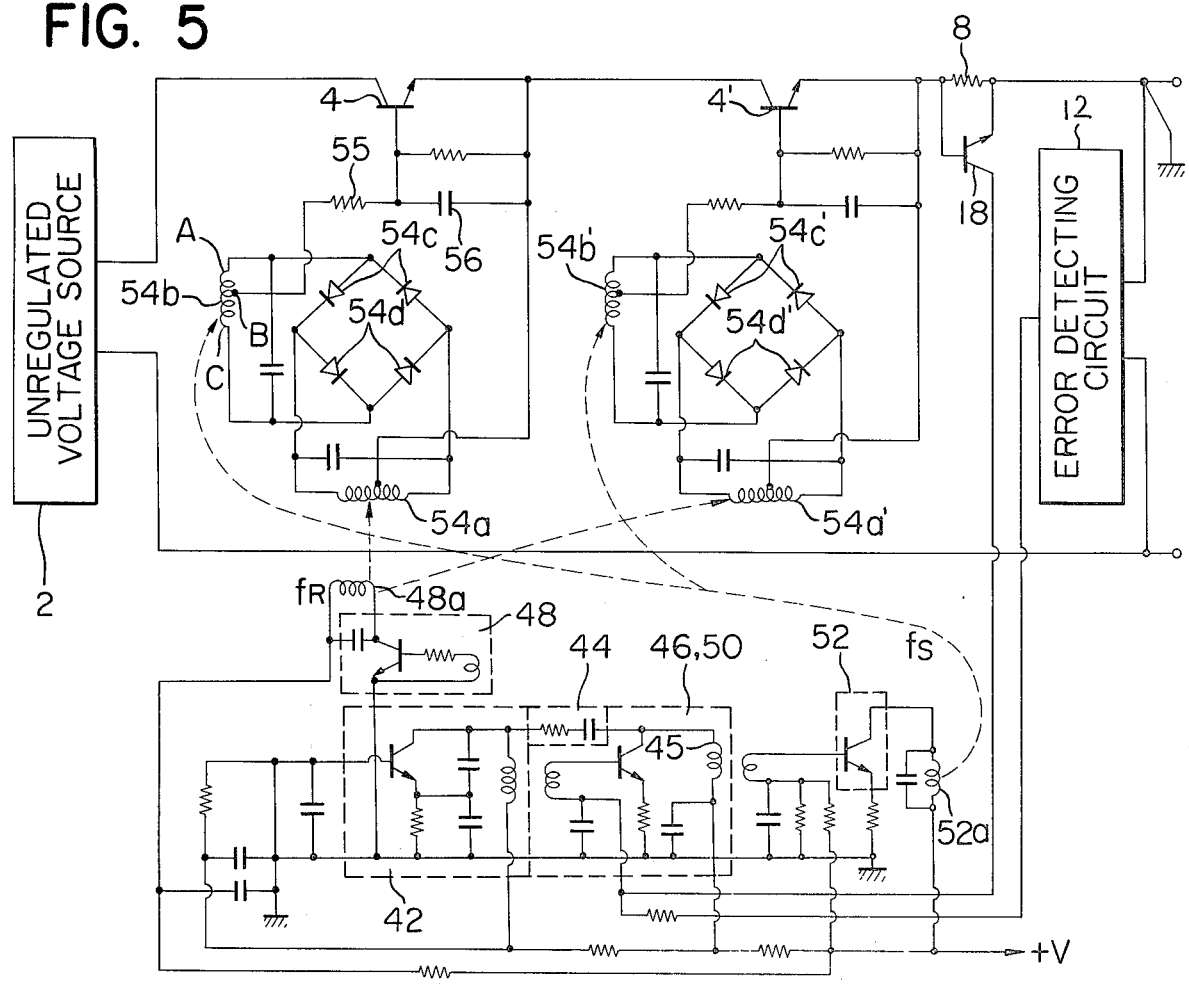
FIG. 5 is a similar diagram showing a specific circuit in the third embodiment.

Reference will now be had to FIG. 5 to describe a specific example of the circuit in the third embodiment now under consideration.

The ($\pi/2$) phase deviation circuit 44 comprising a capacitor and a resistor is connected to the collector of the transistors in the AGC circuit 46. Therefore, the output of the phase deviation circuit 44 and the output of the oscillator 42 having its amplitude modulated in accordance with the output of the error detecting circuit 12 are synthesized by the coil 45, so that a phase difference corresponding to the output of the circuit 12 appears between the output of the coil 45 and the output of the oscillator 42. The output of the coil 45 is amplified and generated from a coil 52a, and received by coils 54b and 54b'.

Phase detecting circuits 54 and 54' will now be described. These include two pairs of diodes 54c, 54d and 54c', 54d'. In accordance with the polarity of the electromotive force resulting from the reception of the reference wave signal $f_R$ from the output coil 48a by the coil 54a, one of the pair of diodes 54c and the pair of diodes 54d becomes conductive and the other pair becomes non-conductive.

Thus, when one pair of diodes 54c is conductive, the portion of the coil 54b between A and B is connected to the base of the control transistor 4, and when the pair of diodes 54d is conductive, the portion of the coil 54b between B and C is connected to the base of the control transistor 4.

Therefore, when the two signals $f_R$ and $f_S$ are in phase with each other, the output of the coil 54b assumes a value similar to that of the output waveform resulting from the signal $f_S$ being full-wave-rectified, but when a phase difference occurs between the two signals, the amplitude of the control signal $f_S$ corresponding to that phase difference is cut away, whereafter the signal is smoothed by the resistor 55 and the capacitor 56, so that the magnitude of the current flowing to the base is determined by the phase difference between the reference wave signal $f_R$ and the control wave signal $f_S$.

The third embodiment employs the reference wave signal and the control wave signal both having the same frequency and therefore, to prevent interference between the two signals, the coil 52a and the coils 54b, 54b' may be disposed substantially parallel to one another and likewise, the coil 48a and the coils 54a, 54a' may be disposed substantially parallel to one another while the coils 52a, 54b, 54b' and the coils 48a, 54a, 54a' may be disposed perpendicular to each other.

Figure 6:
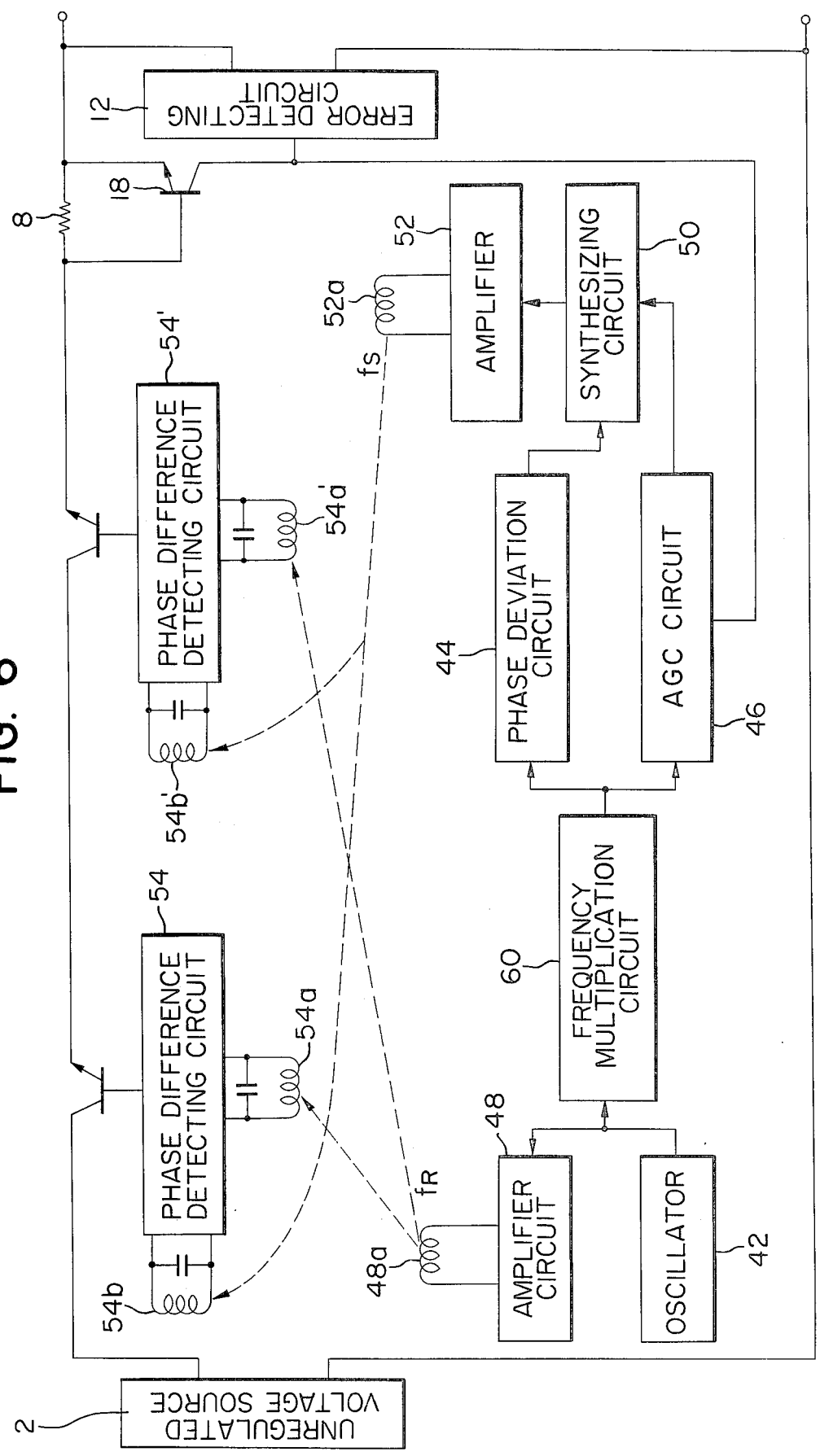
FIG. 6 is a similar diagram showing a modification of the third embodiment.

In the examples shown in FIGS. 4 and 5, the positional relation between the transmission coil and the reception coil is suitably determined to prevent the interference between the two signals $f_S$ and $f_R$. FIG. 6 shows an example in which the prevention of the interference is accomplished by using different frequencies for the control signal $f_S$ and the reference signal $f_R$. The example of FIG. 6 is identical to the example of FIG. 4 with the exception that a frequency multiplication circuit 60 is provided between the phase deviation circuit 44, the AGC circuit 46 and the oscillator 42. This multiplication circuit 60 multiplies the frequency of the output of the oscillator 42 by an odd number and supplies the multiplied frequency to the AGC circuit 46 and the phase deviation circuit 44. Thus, the reference signal $f_R$ from the output coil 48a has a frequency equal to the output frequency of the oscillator 42, while the control signal $f_S$ from the output coil 52a has a frequency equal to the output frequency of the oscillator 42 multiplied by an odd number. Also, the amount of deviation of the two signals from their synchronized condition, namely, the amount of deviation between their rising points, assumes a value corresponding to the output of the error detecting circuit 12.

Thus, the two signals $f_S$ and $f_R$ have different frequencies and therefore, as by equalizing the resonance frequency of the resonance circuit including the coils 54b and 54b' to that of the control signal $f_S$ and likewise equalizing the resonance frequency of the resonance circuit including the coils 54a and 54a' to that of the reference signal $f_R$, the receiver may be made capable of receiving only the necessary signals without any interference occuring therebetween. The phase detecting circuits 54 and 54' control the base currents of the control transistors 4 and 4' in accordance with the amounts of deviation of the two signals $f_R$ and $f_S$ from their synchronized condition.

The position of the multiplication circuit 60 in the present embodiment may be, for example, between the circuits 50 and 52 or between the circuits 42 and 48.

In any of the above-described embodiments, transistors 4 and 4' have been employed as the control elements for controlling the output of the constant voltage circuit but alternatively, vacuum tubes or the like may be employed to increase their withstand voltage. Also, as the detecting circuit for detecting the short-circuiting or the like, use has been made of the resistors 8 and transistor 18 to detect the overcurrent during the short-circuiting, but the short-circuiting or the like may of course be detected by a circuit for detecting the voltage drop between the output terminals 10a and 10b.

According to the present invention, as described above, the circuit for transmitting the error signal to the control transistors comprises high frequency transmitter and receiver. By providing a suitable distance between the transmitter and the receiver, the insulation therebetween can be enhanced, and this readily enables the above-described transmission circuit to have a high voltage withstanding property, as desired.

What is claimed is:

1. A constant high voltage generating circuit for converting the high voltage output between output terminals of an unregulated voltage source into a constant output voltage between output terminals of the constant high voltage generating circuit comprising:
    an error detecting circuit for detecting any error of the output voltage of said constant high voltage generating circuit relative to a predetermined constant output voltage and producing an output that varies in response to said error;
    a high frequency wave generating circuit connected to said error detecting circuit for radiating a high frequency wave that varies in accordance with the varying output of said error detecting circuit;
    a receiving circuit for receiving said high frequency wave;
    a rectifying and smoothing circuit connected to said receiving circuit for producing in response to the received high frequency wave a rectified and smoothed control voltage that varies in accordance with said error; and
    a regulating circuit providing a variable resistance path between an output terminal of said unregulated voltage source and an output terminal of said constant high voltage generating circuit, said regulating circuit having a control terminal to which said control voltage is applied and having means for varying the resistance of said path in response to the control voltage at said control terminal, thereby to regulate the high voltage output of said unregulated voltage source.

2. A constant high voltage generating circuit according to claim 1, wherein said high frequency wave generating circuit generates a wave having an amplitude variable in accordance with the output of said error detecting circuit.

3. A constant high voltage generating circuit according to claim 1, wherein said high frequency wave generating circuit generates a wave having a frequency variable in accordance with the output of said error detecting circuit.

4. A constant high voltage generating circuit according to claim 1, wherein said high frequency wave generating circuit generates a wave having a phase variable in accordance with the output of said error detecting circuit.

5. A constant high voltage generating circuit according to claim 1, wherein said regulating circuit comprises a transistor having its collector and emitter connected between said output terminal of said unregulated voltage source and said output terminal of said constant high voltage generating circuit and having its base connected to said control terminal.

6. A constant high voltage generating circuit according to claim 5, further comprising a short-circuiting detecting circuit for detecting the short-circuiting of said constant high voltage generating circuit, the detection output of said short-circuiting detecting circuit causing said high frequency wave generating circuit to generate a wave for greatly increasing the equivalent collector-emitter resistance of said control transistor.

7. A constant high voltage generating circuit according to claim 1, wherein said high frequency wave generating circuit includes an oscillator, a circuit for modulating the high frequency output of said oscillator by the output of said error detecting circuit, and a coil for radiating said modulated high frequency output as a high frequency wave into the air, and wherein said receiving circuit includes a coil for receiving said modulated high frequency output wave.

* * * * *